US011699959B2

(12) United States Patent
Koyanagi et al.

(10) Patent No.: US 11,699,959 B2
(45) Date of Patent: Jul. 11, 2023

(54) POWER CONVERSION DEVICE

(71) Applicant: Mitsubishi Electric Corporation, Tokyo (JP)

(72) Inventors: Kimiyuki Koyanagi, Tokyo (JP); Masashi Shigemitsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 238 days.

(21) Appl. No.: 17/417,774

(22) PCT Filed: Mar. 1, 2019

(86) PCT No.: PCT/JP2019/007996
§ 371 (c)(1),
(2) Date: Jun. 24, 2021

(87) PCT Pub. No.: WO2020/178877
PCT Pub. Date: Sep. 10, 2020

(65) Prior Publication Data
US 2021/0391807 A1    Dec. 16, 2021

(51) Int. Cl.
*H02M 7/483* (2007.01)
*H02M 1/32* (2007.01)
(Continued)

(52) U.S. Cl.
CPC .......... *H02M 7/4835* (2021.05); *H02M 1/32* (2013.01); *H02M 1/325* (2021.05); *H02M 7/003* (2013.01); *H02M 7/49* (2013.01)

(58) Field of Classification Search
CPC ........ H02M 1/32; H02M 1/322; H02M 1/325; H02M 1/36; H02M 7/003; H02M 7/48;
(Continued)

(56) References Cited

U.S. PATENT DOCUMENTS 6,028,779 A * 2/2000 Sakamoto ............ H02M 7/003
363/55
2010/0118453 A1   5/2010 Dorn et al.
(Continued)

FOREIGN PATENT DOCUMENTS

JP    2010-524426 A    7/2010
JP       5889498 B2    3/2016
WO   2018/110071 A1    6/2018

OTHER PUBLICATIONS

International Search Report and Written Opinion dated Apr. 16, 2019, received for PCT Application No. PCT/JP2019/007996, Filed on Mar. 1, 2019, 8 pages including English Translation.
(Continued)

*Primary Examiner* — Thienvu V Tran
*Assistant Examiner* — Shahzeb K Ahmad
(74) *Attorney, Agent, or Firm* — Xsensus LLP

(57) ABSTRACT

In a power conversion device in which cell converters are connected in series, each cell converter includes: main circuit conductors connecting switching elements and a capacitor to each other; a bypass portion disposed between two external terminals connected to other cell converters; external output conductors connecting the external terminals and the main circuit conductors to each other; and bypass connection conductors connecting the external output conductors and the bypass portion to each other. The bypass connection conductors or the external output conductors are disposed so as to oppose each other at a high-potential side and a low-potential side thereof. The conductors are bent so as to have portions at which currents in parts of the conductors have the same direction. Thus, mutual inductances and self-inductances are increased, whereby short-circuit current flowing to the bypass portion at the time of double failures is suppressed.

18 Claims, 12 Drawing Sheets

(51) Int. Cl.
*H02M 7/49* (2007.01)
*H02M 7/00* (2006.01)

(58) Field of Classification Search
CPC .. H02M 7/483; H02M 7/4833; H02M 7/4835;
H02M 7/4837; H02M 7/487; H02M 7/49;
H02M 7/02; H02M 7/12; H02M 7/155;
H02M 7/19
See application file for complete search history.

(56) References Cited

U.S. PATENT DOCUMENTS

| | | | |
|---|---|---|---|
| 2013/0328541 A1* | 12/2013 | Euler | H02M 7/483 |
| | | | 323/311 |
| 2016/0036314 A1* | 2/2016 | Koyanagi | H02M 7/483 |
| | | | 363/65 |
| 2017/0012521 A1* | 1/2017 | Jimichi | H02M 7/4835 |
| 2018/0302003 A1* | 10/2018 | Mori | H02M 7/1623 |
| 2019/0312522 A1* | 10/2019 | Li | H02M 1/44 |
| 2020/0119659 A1* | 4/2020 | Shinomiya | H02M 1/32 |

OTHER PUBLICATIONS

Office Action dated Mar. 24, 2023 in European Patent Application No. 19 918 119.9, 9 pages.
European Search Report dated Jan. 28, 2022 in European Patent Application No. 19918119.9.

* cited by examiner

# POWER CONVERSION DEVICE

CROSS-REFERENCE TO RELATED APPLICATION

The present application is based on PCT filing PCT/JP2019/007996, filed Mar. 1, 2019, the entire contents of which are incorporated herein by reference.

TECHNICAL FIELD

The present disclosure relates to a power conversion device in which a plurality of cell converters are connected in series.

BACKGROUND ART

In power conversion devices for high-voltage application, multilevel converters have been put into practical use. A multilevel converter has been disclosed that has a circuit configuration in which: a plurality of cell converters are connected in series between AC terminals U, V, and W and DC terminals P and N; and AC voltage is generated at the AC terminals U, V, and W and DC voltage is generated at the DC terminals P and N, through ON/OFF control of semiconductor switching elements included in the converter cells.

Meanwhile, there has been a power conversion device in which, when an abnormality occurs in a cell converter (submodule), output terminals of the cell converter (submodule) at which the abnormality has occurred are bypassed by a bypass portion (short-circuit device) so that a continuous operation can be performed (see, for example, Patent Document 1). A power conversion device in which a plurality of cell converters are connected in series to each other and which is applied to a high-voltage electric power line is such that, when an abnormality occurs in any of the cell converters, a bypass portion that performs closing for output terminals of the failing cell converter to exclude the failing cell converter from the series circuit guarantees a continuous operation of the power conversion device by means of this reliable closing operation. Thus, the bypass portion plays an important role in power management.

However, there is a concern that such a bypass portion is put in a harsh state involving overcurrent or the like owing to the closing operation. If the bypass portion is damaged by being used in the harsh state, there is a case where the cell converter at which the abnormality has occurred cannot be reliably bypassed. Considering this, the applicant conceived of a technology in which, when an abnormality in a cell converter is detected, a bypass portion is closed and, simultaneously with or prior to the closing of the bypass portion, a semiconductor element selected from among a plurality of semiconductor elements so as to continuously form, in parallel to the bypass portion, a current path that does not include the bypass portion is kept in an ON state during a period lasting until the closing of the bypass portion is established (see, for example, Patent Document 2).

CITATION LIST

Patent Document

Patent Document 1: Japanese Laid-open Patent Publication (translation of PCT application) No. 2010-524426 (FIG. 2, etc.)

Patent Document 2: Japanese Patent No. 5889498 (FIG. 7, etc.)

SUMMARY OF THE INVENTION

Problems to be Solved by the Invention

In Patent Document 2, when an abnormality in a cell converter is detected, a bypass portion is closed and, simultaneously with or prior to the closing of the bypass portion, a semiconductor element selected from among a plurality of semiconductor elements so as to continuously form, in parallel to the bypass portion, a current path that does not include the bypass portion is kept in an ON state during a period lasting until the closing of a bypass element is established. However, technologies that deal with an abnormality in a semiconductor element selected so as to continuously form a current path that does not include such a bypass portion have been required recently. That is, a continuous operation of a power conversion device has been required to be guaranteed also in the case where double abnormalities occur.

The present disclosure has been made to solve the above-described problems, and an object of the present disclosure is to obtain a power conversion device in which, when double abnormalities in a cell converter occur, a bypass portion that performs closing for output terminals of the cell converter is prevented from being damaged owing to the closing operation so that a continuous operation can be performed.

Solution to the Problems

A power conversion device according to the present disclosure is a power conversion device in which a plurality of cell converters that perform power conversion are connected in series, each cell converter including: a switching element; a capacitor; a main circuit conductor connecting the switching element and the capacitor to each other; two external terminals connected to other ones of the cell converters; a bypass portion disposed between the two external terminals and subjected to bypass connection; a first conductor portion connecting one of the two external terminals and each of the main circuit conductor and the bypass portion to each other; and a second conductor portion connecting another one of the two external terminals and each of the main circuit conductor and the bypass portion to each other. The first and second conductor portions are each formed in a bent shape between the main circuit conductor and the bypass portion so as to, with respect to a first direction which is a direction of a path from the main circuit conductor to the bypass portion, have a portion that extends in a second direction intersecting with the first direction. A first portion, of the first conductor portion, that extends in the second direction and a second portion, of the second conductor portion, that extends in the second direction are disposed so as to at least partially overlap with each other in a third direction that intersects with the first and second directions. When current flows from the capacitor to the bypass portion, currents in a same direction flow in the first portion and the second portion.

Effect of the Invention

According to the power conversion device according to the present disclosure, overcurrent flowing to the bypass portion can be suppressed, whereby a highly reliable power conversion device can be realized. As a result, it is possible to obtain, without increasing the sizes of cell converters, a small-sized and inexpensive power conversion device that can be continuously operated also in the case where double abnormalities occur in any of the cell converters.

BRIEF DESCRIPTION OF THE DRAWINGS

FIG. 5A is a front view, and FIG. 5B is a right side view.

DESCRIPTION OF EMBODIMENTS

Figure 1:
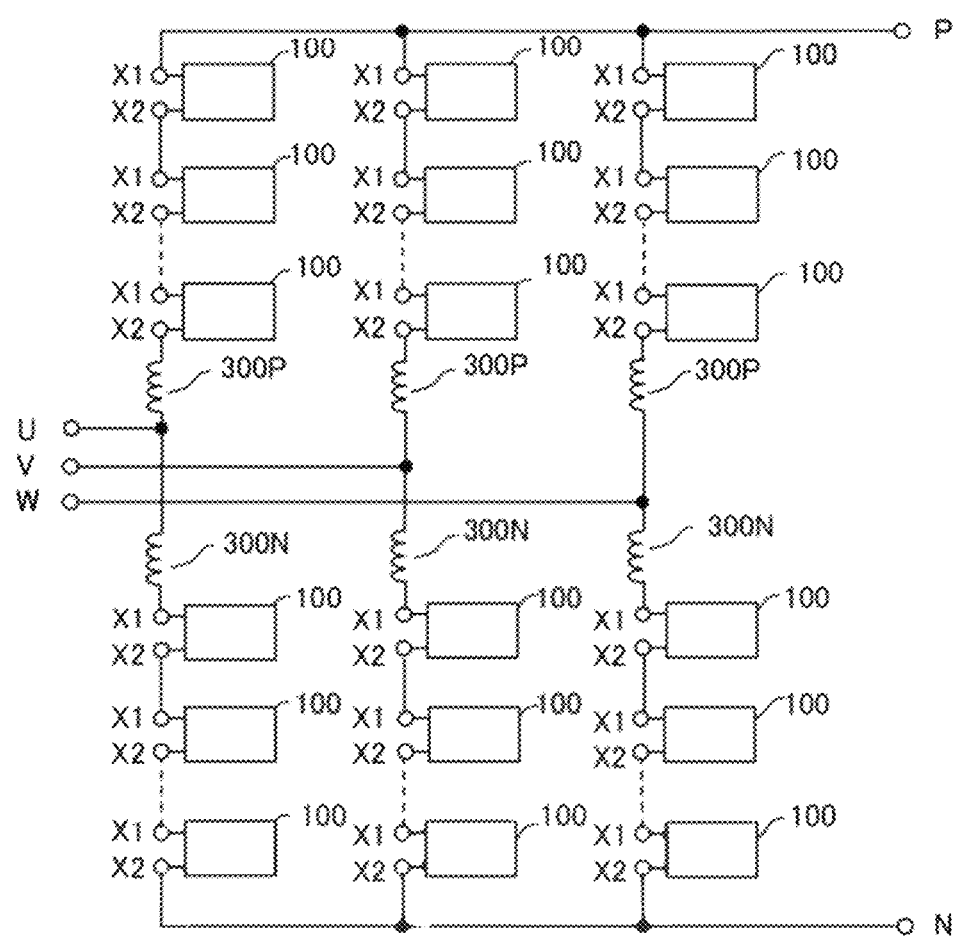
FIG. 1 is a schematic circuit diagram showing a configuration of a power conversion device according to embodiment 1.

Hereinafter, the present embodiments will be described with reference to the drawings. In the drawings, the same or corresponding portions are denoted by the same reference characters.

Embodiment 1

Hereinafter, a power conversion device according to embodiment 1 will be described with reference to the drawings.

FIG. 1 shows an example of a main circuit configuration of the power conversion device according to embodiment 1. It is noted that converters having circuit configurations in which converter cells are connected in series are generally called cascade converters, modular multilevel converters (MMCs), chain connection converters, or the like. Basically, the converters are series connection converters. It is noted that, although described later, a converter cell is defined as one including two or more semiconductor elements and one or more energy accumulating elements.

In FIG. 1, a plurality of cell converters 100 are connected in series between AC terminals U, V, and W and DC terminals P and N, and reactors 300P and 300N are provided therebetween. FIG. 1 is just an example, and the circuit configuration only has to be one in which converter cells are connected in series. For example, the reactors 300P and 300N in each phase may be magnetically coupled to each other to form one reactor. Alternatively, the reactors may be concentrated on the negative electrode side (DC terminal N side). Alternatively, parasitic inductances such as wiring inductances may be provided instead of the reactors.

Figure 2:
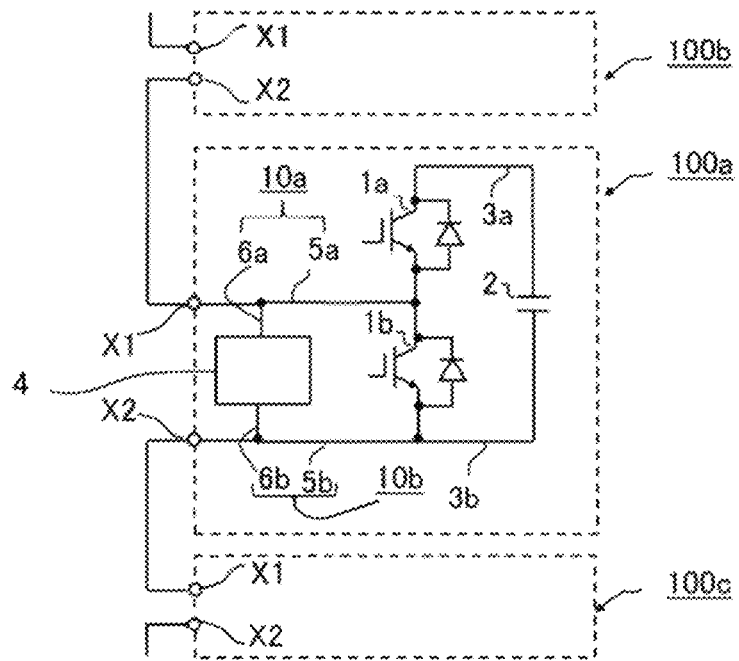
FIG. 2 is a schematic circuit diagram showing a configuration of a cell converter of the power conversion device according to embodiment 1.

FIG. 2 shows some of the cell converters 100 connected in series that are cut out from the power conversion device shown in FIG. 1. FIG. 2 is a schematic circuit diagram showing a configuration of a cell converter 100. Here, a circuit diagram of only a cell converter 100a is shown as a representative out of three cell converters 100a to 100c.

In FIG. 2, the low-potential side of a switching element 1a and the high-potential side of a switching element 1b are connected in series to form a bridge. A capacitor 2 is connected to the high-potential side of the switching element 1a and the low-potential side of the switching element 1b, and accumulates and supplies DC energy according to an operation of the power conversion device. A positive terminal of the capacitor 2 and a high-potential terminal of the switching element 1a are connected to each other by a main circuit conductor 3a on the high-potential side. A negative terminal of the capacitor 2 and the low-potential side of the switching element 1b are connected to each other by a main circuit conductor 3b on the low-potential side. An external terminal X1 of the cell converter 100a is electrically connected to an external terminal X2 of the adjacent cell converter 100b by a conductor outside a housing or the like. An external terminal X2 of the cell converter 100a is electrically connected to an external terminal X1 of the adjacent cell converter 100c by a conductor outside the housing or the like. By these electrical connections, the cell converters 100a to 100c are in a state of being connected in series, and a multilevel converter which is the power conversion device shown in FIG. 1 is formed.

A bypass portion 4 which is closed and enables a continuous operation of the power conversion device at the time of failure of the cell converter, is disposed between: a first external output conductor 5a connecting a connection point between the low-potential side of the switching element 1a and the high-potential side of the switching element 1b and the external terminal X1 on the high-potential side to each other; and a second external output conductor 5b connecting the low-potential side of the switching element 1b and the external terminal X2 on the low-potential side to each other. The first external output conductor 5a and a first bypass connection conductor 6a connecting the first external output conductor 5a and the high-potential side of the bypass portion 4 to each other, form a first conductor portion 10a. The second external output conductor 5b and a second bypass connection conductor 6b connecting the second external output conductor 5b and the low-potential side of the bypass portion 4 to each other, form a second conductor portion 10b.

Figure 3:
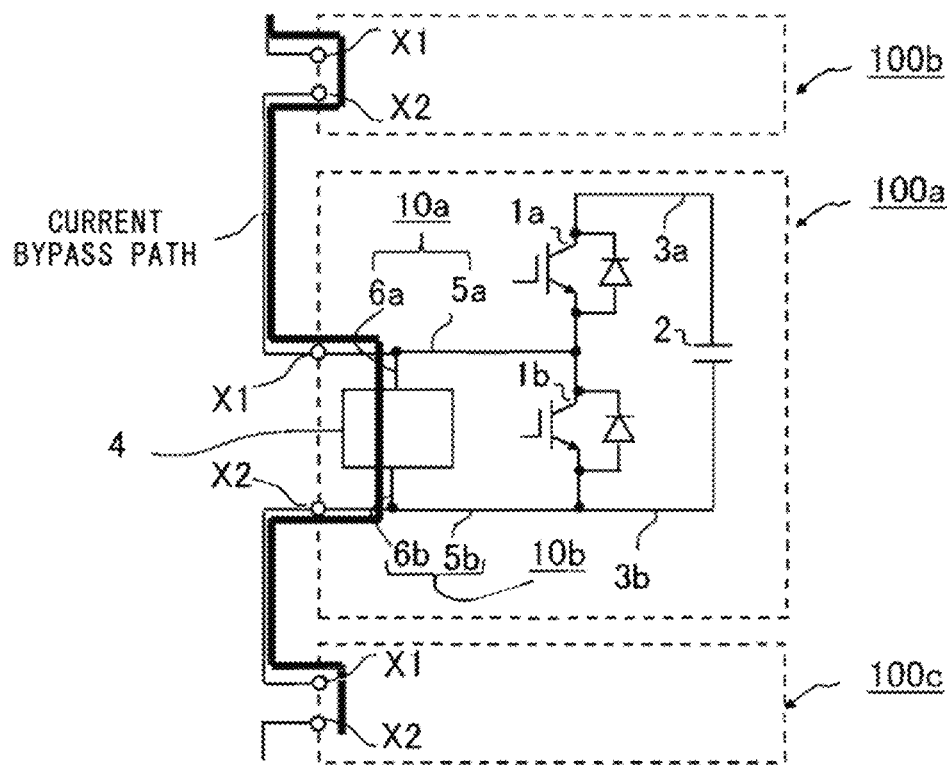
FIG. 3 is a schematic circuit diagram showing a bypass current path across a plurality of cell converters connected in series.

FIG. 3 is a diagram obtained by drawing a bypass current path in the circuit diagram in FIG. 2. If an abnormality occurs in the cell converter 100a, the bypass portion 4 is closed. Specifically, if current flows in a downward direction from the cell converter 100b to the cell converter 100a and the cell converter 100c, current enters the cell converter 100a from the external terminal X1 of the cell converter 100a, passes through the bypass portion 4, is outputted from the external terminal X2, and flows to the cell converter 100c, as indicated by the thick line.

Meanwhile, if current flows in an upward direction from the cell converter 100c to the cell converter 100a and the cell converter 100b, current enters the cell converter 100a from the external terminal X2 of the cell converter 100a, passes through the bypass portion 4, is outputted from the external terminal X1, and flows to the cell converter 100b, as indicated by the thick line. Thus, a continuous operation of the power conversion device can be performed.

Figure 4:
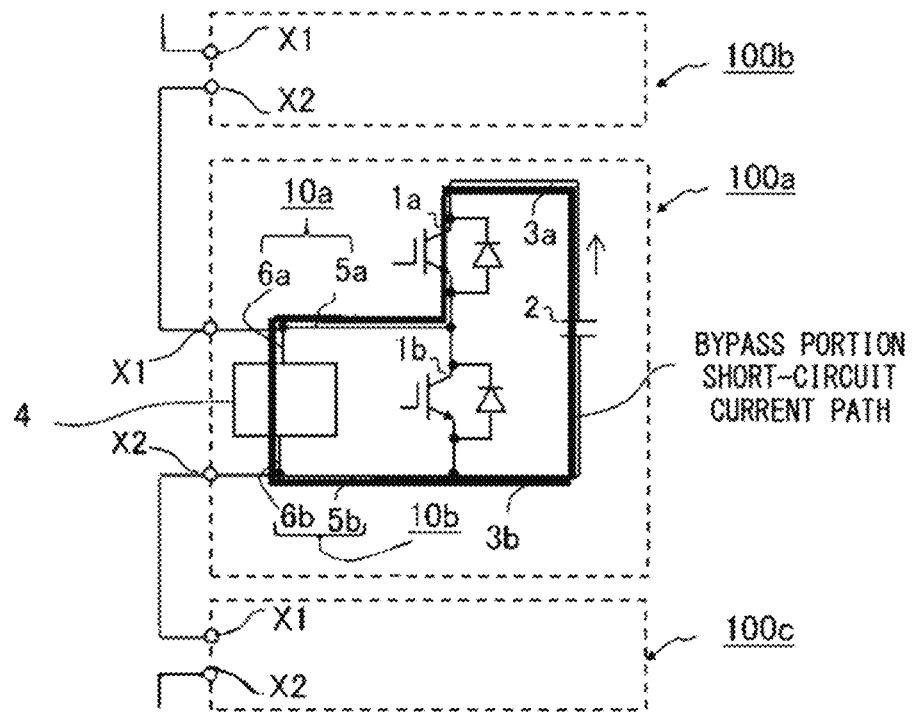
FIG. 4 is a schematic circuit diagram showing a bypass portion short-circuit current path inside the cell converter.

FIG. 4 is a diagram obtained by drawing, in the circuit diagram in FIG. 2, a bypass portion short-circuit current path inside the cell converter. If an abnormality is detected in the cell converter 100a, the bypass portion 4 is closed to form the current bypass path shown in FIG. 3. At this time, the following case is assumed: double abnormalities have occurred in which the switching element 1b is not turned on in a state where the switching element 1a experiences a short-circuit failure. In this case, energy accumulated in the capacitor 2 becomes overcurrent, and the entire overcurrent flows on a circulation path indicated by the thick line in FIG. 4 into the bypass portion 4.

Similarly, the following case is assumed: double abnormalities have occurred in which the switching element 1a is turned on owing to erroneous operation simultaneously with detection of an abnormality in the cell converter 100a. In this case, since an operation logic is set such that the switching element 1b is not turned on when the switching element 1a is ON, energy accumulated in the capacitor 2 becomes overcurrent, and the entire overcurrent flows on the circulation path indicated by the thick line into the bypass portion 4.

If overcurrent flows into the bypass portion 4 in this manner so as to exceed the current resistance capacity thereof, the bypass portion 4 is damaged and cannot perform reliable opening and closing operations thereafter. Thus, a continuous operation of the power conversion device cannot be guaranteed.

Figure 5A:
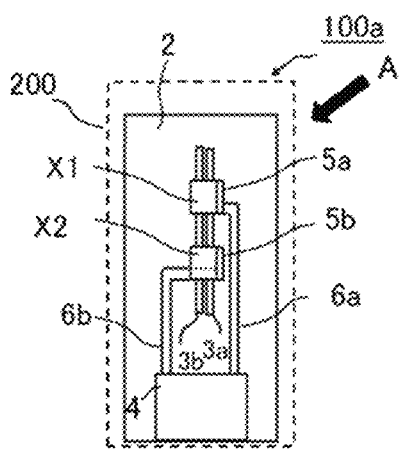
FIG. 5A and FIG. 5B show schematic diagrams of internal arrangement of the cell converter according to embodiment 1.
Figure 5B:
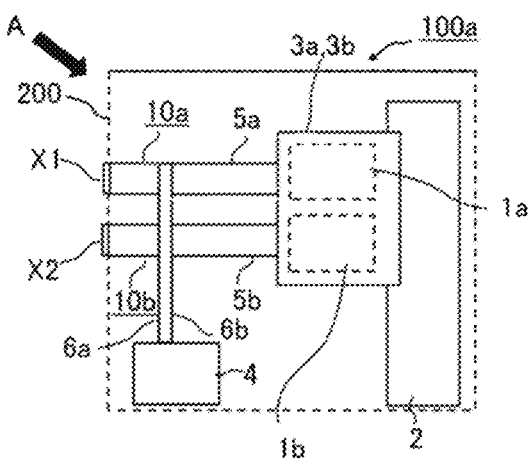
Figure 6A:
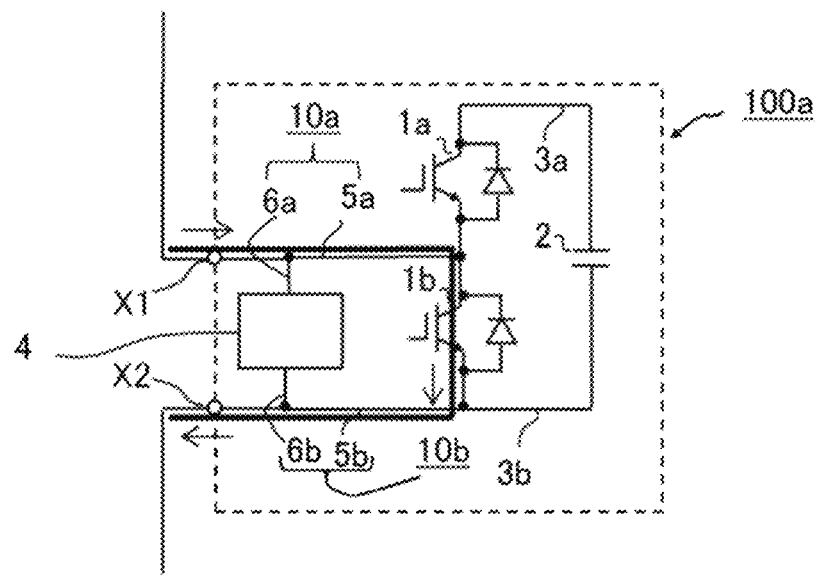
FIG. 6A is a schematic circuit diagram showing a path of current flowing in the cell converter in a steady state.
Figure 6B:
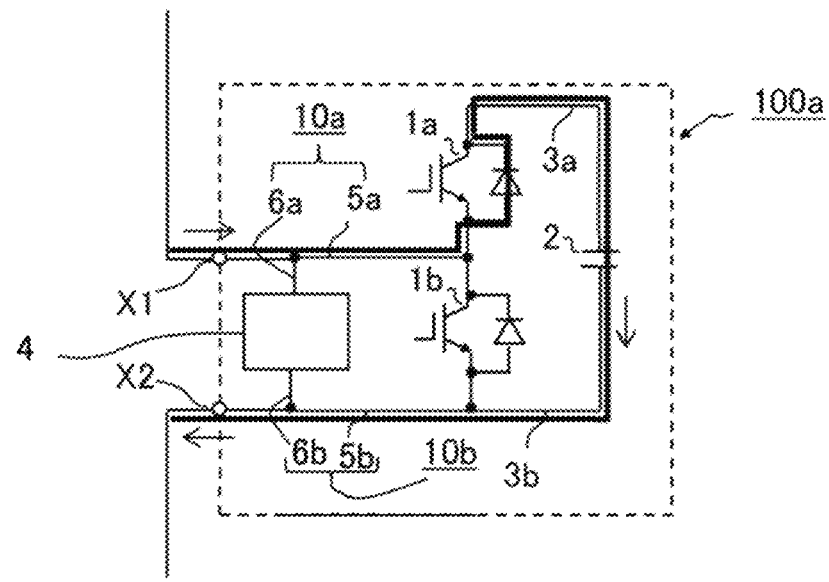
FIG. 6B is a schematic circuit diagram showing another path of current flowing in the cell converter in the steady state.
Figure 6C:
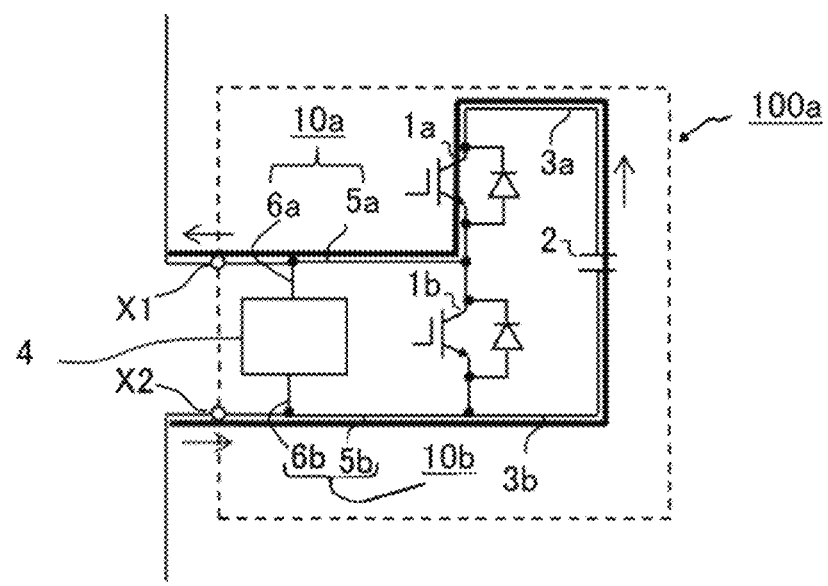
FIG. 6C is a schematic circuit diagram showing another path of current flowing in the cell converter in the steady state.
Figure 6D:
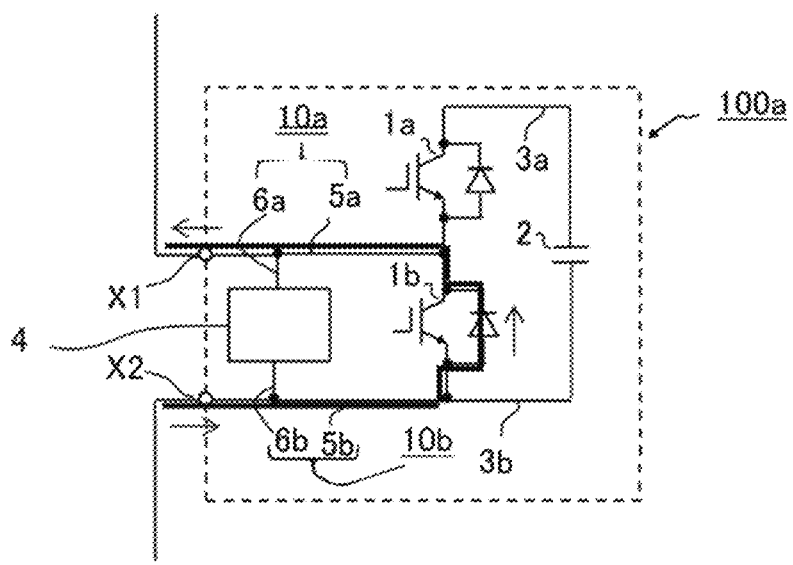
FIG. 6D is a schematic circuit diagram showing another path of current flowing in the cell converter in the steady state.

Next, a structure of the cell converter according to embodiment 1 will be described. FIG. 5A and FIG. 5B show schematic diagrams of internal arrangement of the cell converter 100a. FIG. 5A is a front view, and FIG. 5B is a right side view. In FIG. 5A and FIG. 5B, the constituents of the cell converter 100a are accommodated in a housing 200.

The external terminals X1 and X2 are attached to the front surface of the housing 200. The first external output conductor 5a connected to the external terminal X1 extends in the depth direction of the housing 200 and is connected to the main circuit conductor 3a via a connection point (not shown) between the switching element 1a and the switching element 1b. The second external output conductor 5b connected to the external terminal X2 extends in the depth direction of the housing 200 and is connected to the main circuit conductor 3b. The first external output conductor 5a and the second external output conductor 5b are respectively at a high potential and a low potential, have opposite current directions, and are disposed so as to oppose each other in the vertical direction.

The main circuit conductor 3a is connected to a high-potential-side terminal of the switching element 1a and a high-potential-side terminal (positive terminal) of the capacitor 2, and is at a high potential. The main circuit conductor 3b is connected to a low-potential-side terminal of the switching element 1b and a low-potential-side terminal (negative terminal) of the capacitor 2, and is at a low potential. The main circuit conductor 3a and the main circuit conductor 3b are disposed so as to oppose each other in the horizontal direction such that the directions of currents flowing in the switching element 1a and the switching element 1b are opposite directions.

The first bypass connection conductor 6a has one end connected to a middle portion of the first external output conductor 5a and has another end connected to the high-potential side of the bypass portion 4. The second bypass connection conductor 6b has one end connected to a middle portion of the second external output conductor 5b and has another end connected to the low-potential side of the bypass portion 4. The first bypass connection conductor 6a and the second bypass connection conductor 6b have opposite current directions and are disposed so as to oppose each other in the horizontal direction.

Next, manners in which current flows inside the cell converter 100a in a steady state will be described with reference to FIGS. 6A to 6D.

1) Mode 1: In the case where current is inputted from the external terminal X1 and the switching element 1b is turned on As indicated by the solid line and the arrows in FIG. 6A, current passes through the first external output conductor 5a, the switching element 1b, and the second external output conductor 5b in this order and is outputted from the external terminal X2.

2) Mode 2: In the case where current is inputted from the external terminal X1 and the switching element 1b is not turned on As indicated by the solid line and the arrows in FIG. 6B, current passes through the first external output conductor 5a, a diode portion of the switching element 1a, the main circuit conductor 3a, the capacitor 2, the main circuit conductor 3b, and the second external output conductor 5b in this order and is outputted from the external terminal X2.

3) Mode 3: In the case where current is inputted from the external terminal X2 and the switching element 1a is turned on As indicated by the solid line and the arrows in FIG. 6C, current passes through the second external output conductor 5b, the main circuit conductor 3b, the capacitor 2, the main circuit conductor 3a, the switching element 1a, and the first external output conductor 5a in this order and is outputted from the external terminal X1.

4) Mode 4: In the case where current is inputted from the external terminal X2 and the switching element 1a is not turned on As indicated by the solid line and the arrows in FIG. 6D, current passes through the second external output conductor 5b, a diode portion of the switching element 1b, and the first external output conductor 5a in this order and is outputted from the external terminal X1.

In the case where an abnormality in the cell converter 100a is detected and the bypass portion 4 is closed so that the current path in FIG. 3 is formed, current flows in the following two patterns.

5) Mode 5: Current is inputted from the external terminal X1, passes through the first external output conductor 5a, the first bypass connection conductor 6a, the bypass portion 4, the second bypass connection conductor 6b, and the second external output conductor 5b in this order, and is outputted from the external terminal X2.

6) Mode 6: Current is inputted from the external terminal X2, passes through the second external output conductor 5b, the second bypass connection conductor 6b, the bypass portion 4, the first bypass connection conductor 6a, and the first external output conductor 5a in this order, and is outputted from the external terminal X1 (the direction opposite to the current direction in mode 5).

In the case where an abnormality in the cell converter 100a is detected and the bypass portion 4 is closed so that the current path in FIG. 4 is formed, current flows in the following pattern.

7) Mode 7: Current circulates through the capacitor 2, the main circuit conductor 3a, the switching element 1a, the first external output conductor 5a, the first bypass connection conductor 6a, the bypass portion 4, the second bypass connection conductor 6b, the second external output conductor 5b, the main circuit conductor 3b, and the capacitor 2 in this order.

In the present embodiment, the first external output conductor 5a, of the first conductor portion 10a, between the main circuit conductor 3a and a connection with the first bypass connection conductor 6a and the second external output conductor 5b, of the second conductor portion 10b, between the main circuit conductor 3b and a connection with the second bypass connection conductor 6b, are formed in bent shapes so as to have portions at which the direction of current flowing in the first external output conductor 5a and the direction of current flowing in the second external output conductor 5b are spatially the same direction in the case where the current path in FIG. 4 is formed in the above-described mode 7. Here, the bent shapes include angled shapes obtained by bending in the shapes of polygonal lines and bowed shapes obtained by bending in the shapes of curves.

Figure 7:
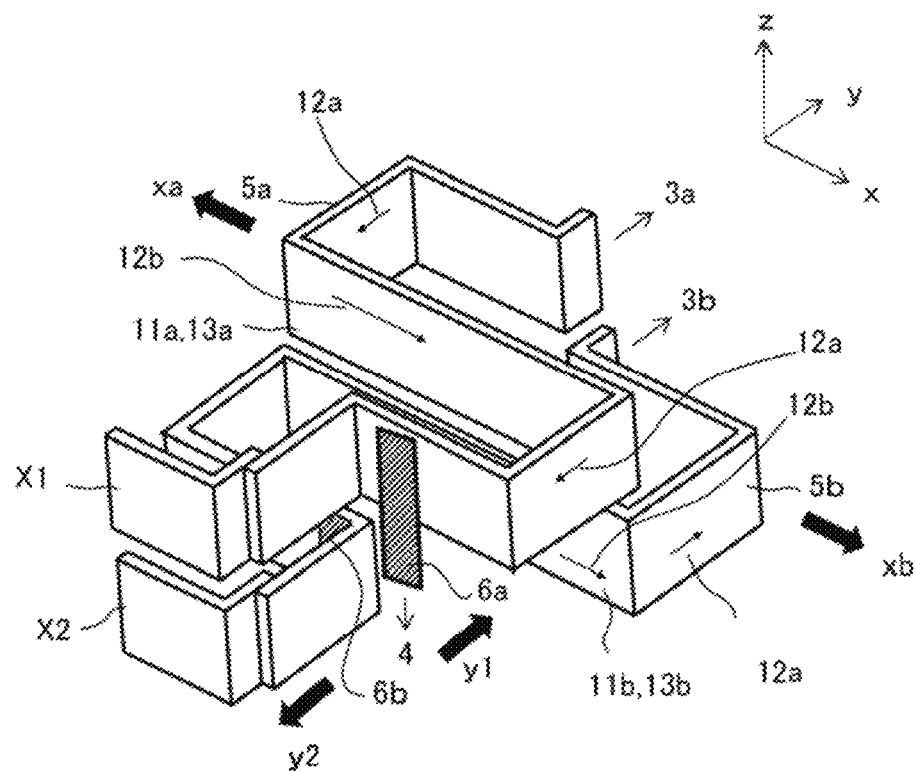
FIG. 7 is a schematic perspective diagram showing arrangement of external output conductors according to embodiment 1 in the cell converter.

FIG. 7 is a schematic diagram showing arrangement of the external output conductors according to the present embodiment in the cell converter. FIG. 7 is a perspective view from a frontward and diagonally upward direction in FIG. 5A and FIG. 5B. That is, FIG. 7 is a perspective view from the direction A indicated by the arrow in FIG. 5A and from the direction A indicated by the arrow in FIG. 5B.

In FIG. 7, the first external output conductor 5a and the second external output conductor 5b are plate-shaped conductors each having a predetermined width and a predetermined thickness, are disposed so as to oppose each other in the vertical direction, and are each bent. The first external output conductor 5a has one end connected to the external terminal X1, has another end connected to the main circuit conductor 3a (not shown), and has a middle portion connected to the first bypass connection conductor 6a which is connected to the bypass portion 4 (not shown). The second external output conductor 5b is disposed so as to be separated downward from the first external output conductor 5a. The second external output conductor 5b has one end connected to the external terminal X2, has another end connected to the main circuit conductor 3b (not shown), and has a middle portion connected to the second bypass connection conductor 6b which is connected to the bypass portion 4 (not shown). The first bypass connection conductor 6a and the second bypass connection conductor 6b are disposed so as to have portions parallel to each other.

Description will be given while FIGS. 8A to 8G explaining the following first external output conductor 5a and second external output conductor 5b according to embodiment 1 are used as schematic plan views (top views) in which the first external output conductor 5a and the second external output conductor 5b in FIG. 7 are respectively developed in the directions of the arrows xa and xb in the x-direction.

Figure 8A:
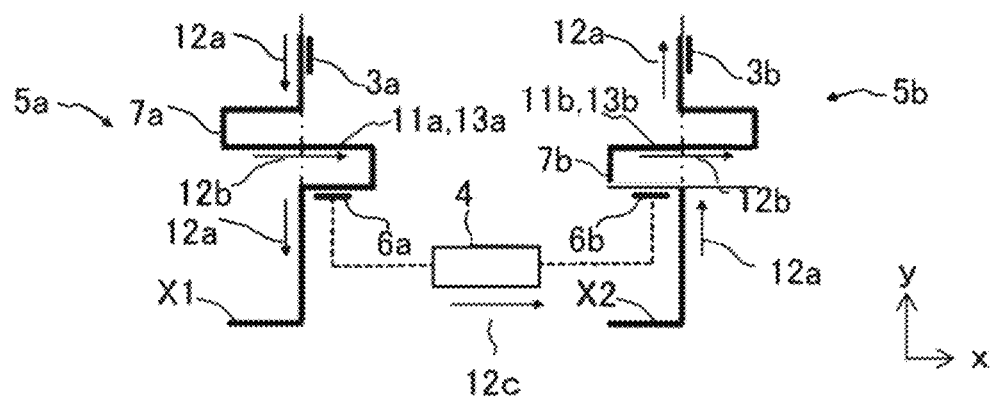
FIG. 8A shows schematic shapes of the external output conductors according to embodiment 1.

FIG. 8A shows schematic shapes of the external output conductors obtained by planarly developing the perspective view in FIG. 7. In FIG. 8A, the arrows 12a, 12b, and 12c each indicate a direction in which current flows, and each indicate a direction in the case where current flows from the high-potential side to the low-potential side of the bypass portion 4. In FIG. 8A, connection locations with the main circuit conductors 3a and 3b are shown in a separated manner, and connection locations with the bypass connection conductors 6a and 6b are also shown in a separated manner.

In FIG. 8A, the first external output conductor 5a is made of an angled-shape conductor 7a, and the second external output conductor 5b is made of an angled-shape conductor 7b. The first external output conductor 5a has the one end connected to the external terminal X1, has the other end connected to the main circuit conductor 3a, and has the middle portion connected to one end of the first bypass connection conductor 6a. Another end of the first bypass connection conductor 6a is connected to the high-potential side of the bypass portion 4. The second external output conductor 5b has the one end connected to the external terminal X2, has the other end connected to the main circuit conductor 3b, and has the middle portion connected to one end of the second bypass connection conductor 6b. Another end of the second bypass connection conductor 6b is connected to the low-potential side of the bypass portion 4.

The first external output conductor 5a has a first portion 11a formed so as to extend along a second direction (x-direction) perpendicular to a first direction (y-direction, the depth direction of the housing 200) which is parallel to the arrow 12a and which is the direction of a path from the main circuit conductor 3a toward the external terminal X1. Similarly, the second external output conductor 5b has a second portion 11b formed so as to extend along the second direction perpendicular to the first direction. Further, the first portion 11a provided to the first external output conductor 5a is located so as to at least partially overlap with the second portion 11b of the second external output conductor 5b in a third direction (the z-direction in FIG. 7) perpendicular to both the first and second directions.

Returning to FIG. 7, the first portion 11a and the second portion 11b have the same current direction 12b and are disposed so as to adjacently oppose each other in the third direction (z-direction). Further, the first portion 11a is formed in a plate shape so as to have a first surface 13a, and the second portion 11b is formed in a plate shape so as to have a second surface 13b. The first surface 13a and the second surface 13b are each parallel to the third direction. The first portion 11a and the second portion 11b are disposed so as to be adjacent to each other in a direction parallel to the first surface 13a and the second surface 13b.

If the first surface 13a and the second surface 13b are each parallel to the third direction in this manner, influence of electromagnetic repulsive force when short-circuit current flows to the bypass portion 4 can be alleviated at a portion at which the first external output conductor 5a is connected to the first bypass connection conductor 6a and a portion at which the second external output conductor 5b is connected to the second bypass connection conductor 6b. Accordingly, deformations of the first bypass connection conductor 6a, the second bypass connection conductor 6b, the first external output conductor 5a, and the second external output conductor 5b can be suppressed.

Figure 8B:
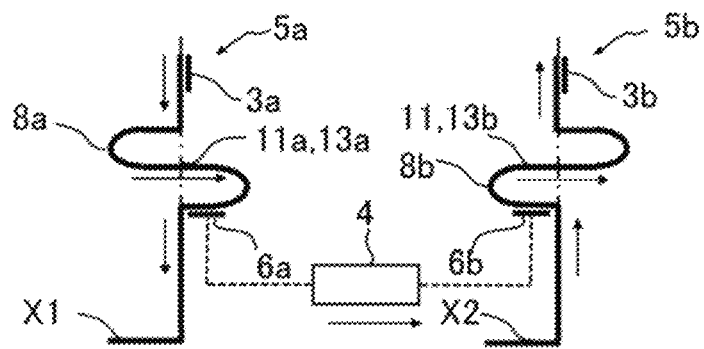
FIG. 8B shows other schematic shapes of the external output conductors according to embodiment 1.

FIG. 8B shows a configuration in which the bent shapes in FIG. 8A are formed by bowing plate-shaped conductors. In FIG. 8B, the first external output conductor 5a is made of a bowed-shape conductor 8a, and the second external output conductor 5b is made of a bowed-shape conductor 8b. In this structure as well, the first external output conductor 5a has the first portion 11a and the first surface 13a formed so as to extend along the second direction (x-direction), the second external output conductor 5b has the second portion 11b and the second surface 13b formed so as to extend along the second direction, and currents flow in spatially the same direction in the first surface 13a and the second surface 13b. Apart from the shapes of the first and second external output conductors, operations are the same as those in FIG. 8A.

Figure 8C:
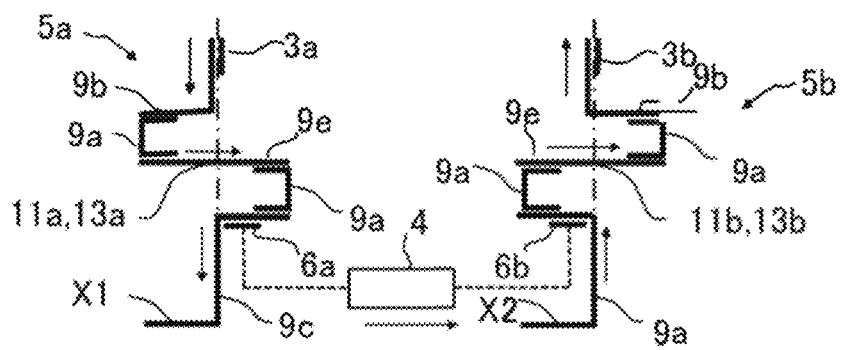
FIG. 8C shows other schematic shapes of the external output conductors according to embodiment 1.

Although FIG. 8A shows the external output conductors each formed in a bent shape by angling a single plate-shaped conductor, in FIG. 8C, the first and second external output conductors 5a and 5b are formed in the same angled shapes as those of the angled-shape conductors 7a and 7b in FIG. 8A by joining rectangular U-shaped conductors 9a, L-shaped conductors 9b, a rectangular S-shaped conductor 9c, and linear conductors 9e. Although the angled-shape conductors 7a and 7b in FIG. 8A are each formed of a single conductor and thus are difficult to be machined, the same shapes are obtained by combining a plurality of conductors that are easily machined. Apart from the shapes of the external output conductors, operations are the same as those in the aforementioned FIG. 8A.

Figure 8D:
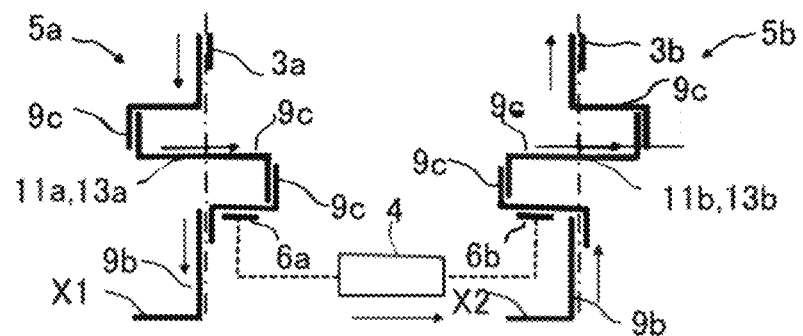
FIG. 8D shows other schematic shapes of the external output conductors according to embodiment 1.

FIG. 8D is a modification of FIG. 8C. In FIG. 8D, the first and second external output conductors 5a and 5b are formed in the same angled shapes as those of the angled-shape conductors 7a and 7b by joining L-shaped conductors 9b and rectangular S-shaped conductors 9c. Thus, the number of the types of shape conductors to be used can be reduced from four to two as compared to the configuration in the aforementioned FIG. 8C. Apart from the shapes of the external output conductors, operations are the same as those in the aforementioned FIG. 8A.

Figure 8E:
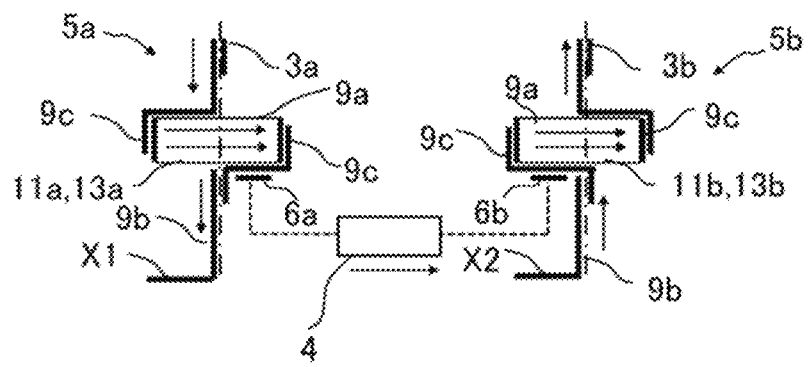
FIG. 8E shows other schematic shapes of the external output conductors according to embodiment 1.

FIG. 8E is a modification of FIG. 8D. In FIG. 8E, rectangular S-shaped conductors 9c are replaced with rectangular U-shaped conductors 9a. Out of these rectangular U-shaped conductors 9a, a rectangular U-shaped conductor 9a for the first external output conductor 5a is attached so as to have a flat surface portion that is close to a lower side, i.e., the second external output conductor 5b, and a rectangular U-shaped conductor 9a for the second external output conductor 5b is attached so as to have a flat surface portion that is, in an opposing manner, close to an upper side, i.e., the first external output conductor 5a. Apart from the shapes of the external output conductors, operations are the same as those in the aforementioned FIG. 8A.

Figure 8F:
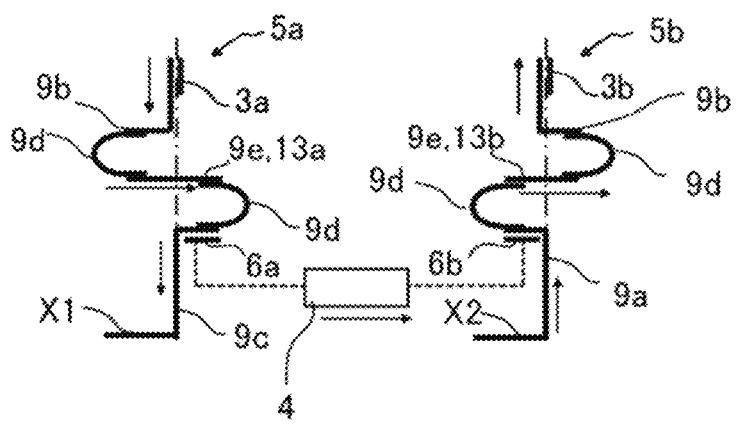
FIG. 8F shows other schematic shapes of the external output conductors according to embodiment 1.

Although FIG. 8B shows the external output conductors each formed in a bent shape by bowing a single plate-shaped conductor, in FIG. 8F, the first and second external output conductors 5a and 5b are formed in the same bowed shapes as those of the bowed-shape conductors 8a and 8b in FIG. 8B by joining U-shaped conductors 9d, L-shaped conductors 9b, a rectangular U-shaped conductor 9a, a rectangular S-shaped conductor 9c, and linear conductors 9e. Although the bowed-shape conductors 8a and 8b are each formed of a single conductor and thus are difficult to be machined, the same shapes are obtained by combining a plurality of conductors that are easily machined. Apart from the shapes of the external output conductors, operations are the same as those in the aforementioned FIG. 8A.

Figure 8G:
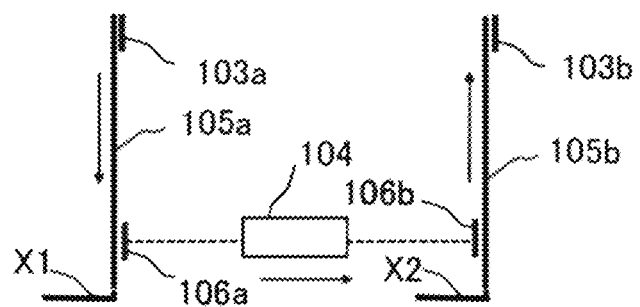
FIG. 8G shows an example of external output conductors to be compared with the external output conductors according to embodiment 1.

FIG. 8G shows linear external output conductors. A first external output conductor 105a and a second external output conductor 105b are linear. The external output conductor 105a has one end connected to an external terminal X1, has another end connected to a main circuit conductor 103a, and has a middle portion connected to one end of a first bypass connection conductor 106a. Another end of the first bypass connection conductor 106a is connected to the high-potential side of a bypass portion 104. The second external output conductor 105b has one end connected to an external terminal X2, has another end connected to a main circuit conductor 103b, and has a middle portion connected to one end of a second bypass connection conductor 106b. Another end of the second bypass connection conductor 106b is connected to the low-potential side of the bypass portion 104. Current in the first external output conductor 105a and current in the second external output conductor 105b flow in opposite directions as indicated by the arrows, and the first external output conductor 105a and the second external output conductor 105b are disposed so as to face each other.

Next, functions and effects of the shapes of the external output conductors according to the present embodiment shown in FIG. 8A to FIG. 8F will be described through comparison with FIG. 8G.

First, in FIG. 8G, the first external output conductor 105a and the second external output conductor 105b are linear, and the connection between the first bypass connection conductor 106a and the main circuit conductor 103a, and the connection between the second bypass connection conductor 106b and the main circuit conductor 103b, are shortest. Therefore, the self-inductance (Lc0) of the first external output conductor 105a and the self-inductance (Ld0) of the second external output conductor 105b are low. In addition, the first external output conductor 105a and the second external output conductor 105b are disposed so as to face each other, and currents in the external output conductors flow in different directions. Therefore, negative mutual inductances (−M) are generated. A combined inductance L0 is expressed with the following expression (1).

$$L0 = Lc0 + Ld0 - 2M \tag{1}$$

Meanwhile, in FIG. 8A, the first external output conductor 5a and the second external output conductor 5b are bent and thus have increased wiring lengths. Accordingly, the first external output conductor 5a and the second external output conductor 5b respectively have a higher self-inductance (Lc1: Lc1>Lc0) and a higher self-inductance (Ld1: Ld1>Ld0) than the external output conductors having the shortest wiring lengths. In addition, current in the portion 11a of the first external output conductor 5a and current in the portion 11b of the second external output conductor 5b flow in spatially the same direction. Further, the portion 11a and the portion 11b are disposed so as to face each other along the current direction. Therefore, positive mutual inductances (+M) are generated. A combined inductance L1 is expressed with the following expression (2).

$$L1 = Lc1 + Ld1 + 2M \quad (2)$$

It is found that L1>L0 is satisfied.

That is, the combined inductance becomes higher than that in the conventional configuration. Consequently, short-circuit current indicated by the thick line in FIG. 4 is suppressed before flowing to the bypass portion 4. Therefore, the bypass portion 4 can be inhibited from being damaged.

The shapes of the external output conductors in FIG. 8B to FIG. 8F also allow the combined inductances to be higher than that in the conventional configuration in the same manner as in FIG. 8A, whereby the same advantageous effect can be exhibited. That is, since short-circuit current indicated by the thick line in FIG. 4 is suppressed before flowing to the bypass portion 4, the bypass portion 4 can be inhibited from being damaged.

In FIG. 8A to FIG. 8F, the main circuit conductor 3a and the main circuit conductor 3b are shown so as to oppose each other. It is preferable that: the main circuit conductor 3a and the main circuit conductor 3b are disposed as shown in FIG. 8A to FIG. 8F; and negative mutual inductances are generated between the main circuit conductor 3a and the main circuit conductor 3b so that low inductances are obtained. The main circuit conductor 3a and the main circuit conductor 3b having high inductances lead to application of high voltages to the switching elements 1a and 1b at the time of a normal operation, and thus are not preferable. Meanwhile, the main circuit conductors having low inductances lead to higher short-circuit current, but the configuration of the present embodiment enables suppression of the short-circuit current.

In FIG. 7 and FIG. 8A to FIG. 8F, examples in which the second direction is perpendicular to the first direction have been shown. However, if the second direction intersects with the first direction, the second direction does not need to be perpendicular thereto. Current flowing in the second direction only has to have a component in a direction perpendicular to the first direction. Further, in the case where currents flowing in the second direction are opposite to each other at some locations depending on the arrangement of the bent shapes, if components in the same current direction are set to be higher than components in opposite current directions, the third term in the above-described expression (2) takes a positive value, whereby short-circuit current is suppressed before flowing to the bypass portion 4.

Figure 8H:
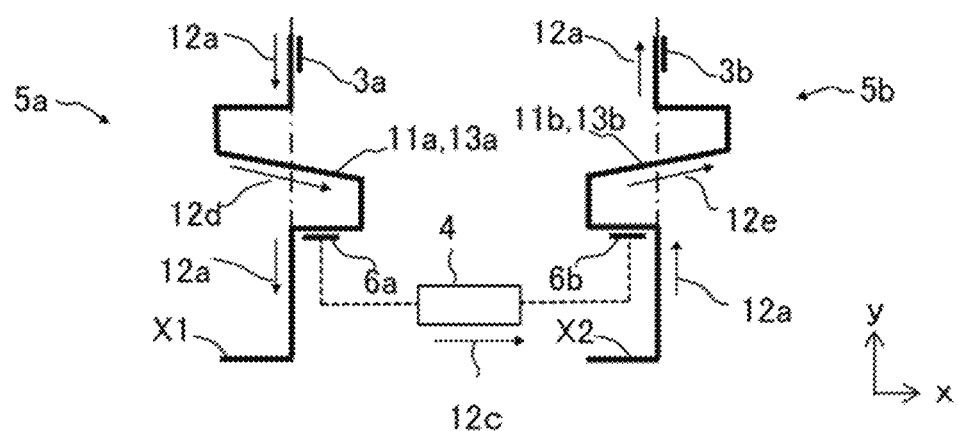
FIG. 8H shows other schematic shapes of the external output conductors according to embodiment 1.

For example, FIG. 8H is a modification of FIG. 8A. While FIG. 8A shows the direction of the arrow 12b as the second direction, FIG. 8H is a diagram showing bent shapes formed such that the second direction is set to the direction of the arrow 12d in the first external output conductor 5a and is set to the direction of the arrow 12e in the second external output conductor 5b. Each of the arrows 12d and 12e is, for example, within an angle range not larger than 30 degrees relative to the arrow 12b. In addition, an angle between the arrow 12d and the arrow 12e is, for example, not larger than 60 degrees. In this case as well, the first portion 11a and the second portion 11b can exhibit the effect due to components in the same current direction 12b and can also exhibit the effect due to parallel components in the first surface 13a of the first portion 11a and the second surface 13b of the second portion 11b, i.e., the effect of alleviating influence of electromagnetic repulsive force when short-circuit current flows to the bypass portion 4.

Figure 8I:
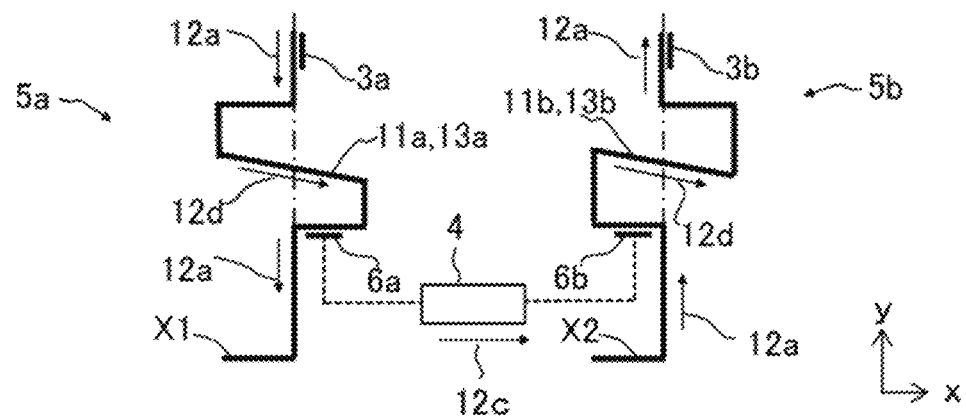
FIG. 8I shows other schematic shapes of the external output conductors according to embodiment 1.

Furthermore, FIG. 8I is another modification of FIG. 8A. In FIG. 8I, bent shapes are formed such that the second direction is set to the direction of the arrow 12d in both the first external output conductor 5a and the second external output conductor 5b. The arrow 12d is, for example, within an angle range not larger than 45 degrees relative to the arrow 12b. In this case as well, the first portion 11a and the second portion 11b can exhibit the effect due to components in the same current direction 12b. Further, the first surface 13a of the first portion 11a and the second surface 13b of the second portion 11b are parallel to each other, whereby it is also possible to exhibit the effect of alleviating influence of electromagnetic repulsive force when short-circuit current flows to the bypass portion 4.

Although two exemplary modifications of FIG. 8A have been shown, the same applies also to FIG. 8B to FIG. 8F. Specifically, if the second direction intersects with the first direction, the second direction does not need to be perpendicular thereto, and current flowing in the second direction only has to have a component in a direction perpendicular to the first direction.

In this manner: the second direction does not have to be perpendicular to the first direction and only has to be a direction intersecting with the first direction at an angle that is within the predetermined range; there only have to be components that are perpendicular to the first direction and that are in the same current direction; and, out of current components generated by forming the bent shapes, components in the same current direction are set to be higher than components in opposite current directions.

In addition, although not shown, a board and a power supply for driving the switching elements 1a and 1b and the bypass portion 4 are present in a space from the location at which the bypass portion 4 is disposed to the housing 200 for the cell converter located outward. Thus, if a configuration is made in which positive mutual inductances (+M) are generated, there is no need for elongating, in order to increase the self-inductances, the lengths in the lateral direction of the external output conductors from the location at which the bypass portion 4 is disposed to a space located outward. Therefore, the external output conductors can be formed in reduced sizes.

As described above, embodiment 1 is such that: the shape of the first external output conductor 5a between the main circuit conductor 3a and the connection with the first bypass connection conductor 6a, and the shape of the second external output conductor 5b between the main circuit conductor 3b and the connection with the second bypass connection conductor 6b, are formed so as to include bent shapes; the first external output conductor 5a and the second external output conductor 5b have the first and second portions which extend in the direction perpendicular to the direction of each of the paths of the connections between the main circuit conductors 3a and 3b and the first and second bypass connection conductors 6a and 6b, i.e., the depth direction of the housing, respectively; these first and second portions at least spatially overlap with each other; and the directions of currents in the first and second portions are the same direction when double abnormalities occur in the cell converter. Consequently, the inductances are increased, and thus overcurrent flowing to the bypass portion 4 can be suppressed, whereby a highly reliable power conversion device can be realized. Further, the above-described external output conductors 5a and 5b having the bent shapes can be disposed by making use of the space in the housing. Thus, it is possible to obtain, without increasing the sizes of the cell converters, a small-sized and inexpensive power conversion device that can be continuously operated also in the case where double abnormalities occur in any of the cell converters.

Embodiment 2

In embodiment 1, the first external output conductor 5a, of the first conductor portion 10a, between the main circuit conductor 3a and the connection with the first bypass connection conductor 6a and the second external output conductor 5b, of the second conductor portion 10b, between the main circuit conductor 3b and the connection with the second bypass connection conductor 6b, are formed in the above-described shapes so as to have portions at which the direction of current flowing in the first external output conductor 5a and the direction of current flowing in the second external output conductor 5b are spatially the same direction in the case where the current path in FIG. 4 is formed in the above-described mode 7. Meanwhile, in the present embodiment 2, the first bypass connection conductor 6a of the first conductor portion 10a and the second bypass connection conductor 6b of the second conductor portion 10b, are formed in bent shapes so as to have portions at which the direction of current flowing in the first bypass connection conductor 6a and the direction of current flowing in the second bypass connection conductor 6b are spatially the same direction. In the same manner as in embodiment 1, the bent shapes include angled shapes obtained by bending in the shapes of polygonal lines and bowed shapes obtained by bending in the shapes of curves.

Description will be given while FIGS. 9A to 9G explaining the following first bypass connection conductor 6a and second bypass connection conductor 6b according to embodiment 2 are used as schematic plan views (right side views) in which: the first external output conductor 5a and the second external output conductor 5b in FIG. 7 are respectively replaced with the external output conductors in FIG. 8G; and the first bypass connection conductor 6a and the second bypass connection conductor 6b shown so as to overlap with each other in the right side view in FIG. 5B are respectively developed in the directions of the arrows y1 and y2 in the y-direction in FIG. 7.

Figure 9A:
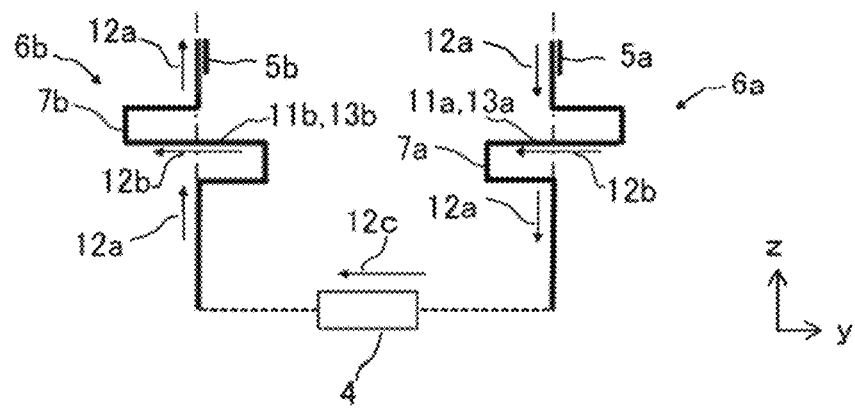
FIG. 9A shows schematic shapes of bypass connection conductors according to embodiment 2.

In FIG. 9A, the first bypass connection conductor 6a is made of an angled-shape conductor 7a, and the second bypass connection conductor 6b is made of an angled-shape conductor 7b. The first bypass connection conductor 6a has one end connected to the first external output conductor 5a and has another end connected to the high-potential side of the bypass portion 4. The second bypass connection conductor 6b has one end connected to the second external output conductor 5b and has another end connected to the low-potential side of the bypass portion 4.

The first bypass connection conductor 6a has a first portion 11a formed so as to extend along a second direction (the y-direction in FIG. 7) perpendicular to a first direction (the z-direction in FIG. 7) which is parallel to the arrow 12a and which is the direction of a path from the first external output conductor 5a toward the high-potential side of the bypass portion 4. Similarly, the second bypass connection conductor 6b has a second portion 11b formed so as to extend along the second direction perpendicular to the first direction which is the direction of a path from the second external output conductor 5b toward the low-potential side of the bypass portion 4. Further, the first portion 11a of the first bypass connection conductor 6a is located so as to at least partially overlap with the second portion 11b of the second bypass connection conductor 6b in a third direction (the x-direction in FIG. 7) perpendicular to both the first and second directions.

That is, the first portion 11a of the first bypass connection conductor 6a and the second portion 11b of the second bypass connection conductor 6b have the same current direction which is indicated by the arrow 12b and which is the second direction, and are disposed so as to adjacently oppose each other in the third direction. Further, the first portion 11a is formed in a plate shape so as to have a first surface 13a, and the second portion 11b is formed in a plate shape so as to have a second surface 13b. The first surface 13a and the second surface 13b are each parallel to the third direction. The first portion 11a and the second portion 11b are disposed so as to be adjacent to each other in a direction parallel to the first surface 13a and the second surface 13b.

If the first surface 13a and the second surface 13b are each parallel to the third direction, influence of electromagnetic repulsive force when short-circuit current flows to the bypass portion 4 can be alleviated at portions at which the first bypass connection conductor 6a is connected to the bypass portion 4 and the first external output conductor 5a and portions at which the second bypass connection conductor 6b is connected to the bypass portion 4 and the second external output conductor 5b. Accordingly, deformations of the first bypass connection conductor 6a, the second bypass connection conductor 6b, the first external output conductor 5a, and the second external output conductor 5b can be suppressed.

Figure 9B:
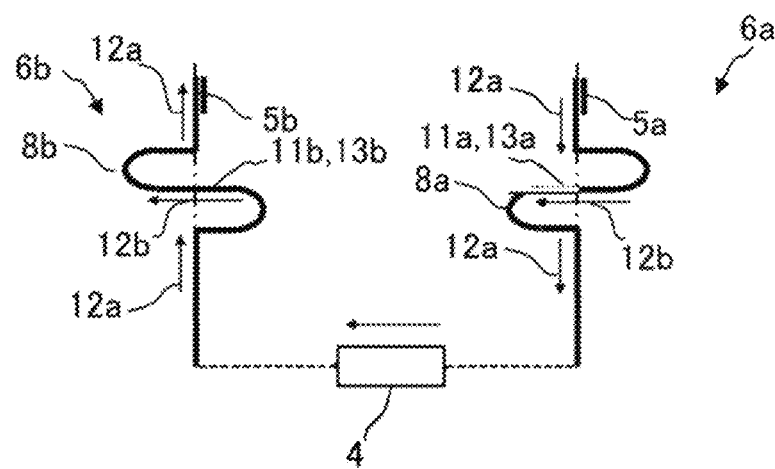
FIG. 9B shows other schematic shapes of the bypass connection conductors according to embodiment 2.

FIG. 9B shows a configuration in which the bent shapes in FIG. 9A are formed by bowing plate-shaped conductors. In FIG. 9B, the first bypass connection conductor 6a is made of a bowed-shape conductor 8a, and the second bypass connection conductor 6b is made of a bowed-shape conductor 8b. In this structure as well, the first bypass connection conductor 6a has the first portion 11a and the first surface 13a formed so as to extend along the second direction (y-direction), the second bypass connection conductor 6b has the second portion 11b and the second surface 13b formed so as to extend along the second direction, and currents flow in spatially the same direction in the first surface 13a and the second surface 13b. Apart from the shapes of the bypass connection conductors, operations are the same as those in FIG. 9A.

Figure 9C:
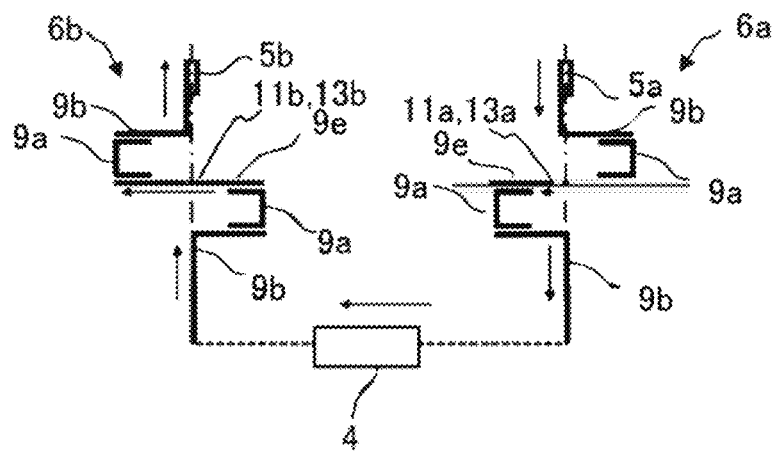
FIG. 9C shows other schematic shapes of the bypass connection conductors according to embodiment 2.

Although FIG. 9A shows the bypass connection conductors each formed in a bent shape by angling a single plate-shaped conductor, in FIG. 9C, the first and second bypass connection conductors 6a and 6b are formed in the same angled shapes as those of the angled-shape conductors 7a and 7b in FIG. 9A by joining rectangular U-shaped conductors 9a, L-shaped conductors 9b, and linear conductors 9e. Although the angled-shape conductors 7a and 7b in FIG. 9A are each formed of a single conductor and thus are difficult to be machined, the same shapes are obtained by combining a plurality of conductors that are easily machined. Apart from the shapes of the bypass connection conductors, operations are the same as those in the aforementioned FIG. 9A.

Figure 9D:
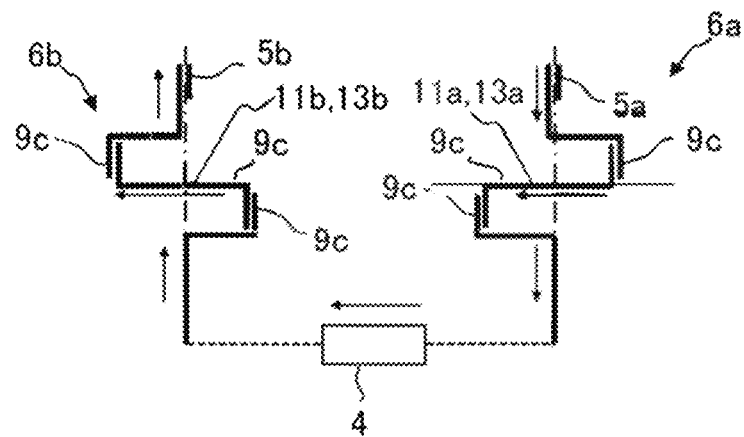
FIG. 9D shows other schematic shapes of the bypass connection conductors according to embodiment 2.

FIG. 9D is a modification of FIG. 9C. In FIG. 9D, the first and second bypass connection conductors 6a and 6b are formed in the same angled shapes as those of the angled-shape conductors 7a and 7b by joining rectangular S-shaped conductors 9c. Thus, the number of the types of shape conductors to be used can be reduced from three to one as compared to the configuration in the aforementioned FIG. 9C. Apart from the shapes of the bypass connection conductors, operations are the same as those in the aforementioned FIG. 9A.

Figure 9E:
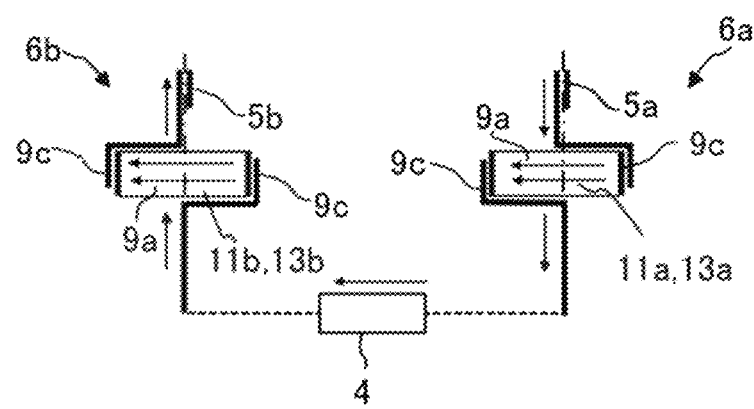
FIG. 9E shows other schematic shapes of the bypass connection conductors according to embodiment 2.

FIG. 9E is a modification of FIG. 9D. In FIG. 9E, rectangular S-shaped conductors 9c are replaced with rectangular U-shaped conductors 9a. Out of these rectangular U-shaped conductors 9a, a rectangular U-shaped conductor 9a for the first bypass connection conductor 6a is attached so as to have a flat surface portion that is close to a left side, i.e., the second bypass connection conductor 6b, and a rectangular U-shaped conductor 9a for the second bypass connection conductor 6b is attached so as to have a flat surface portion that is, in an opposing manner, close to a right side, i.e., the first bypass connection conductor 6a. Apart from the shapes of the bypass connection conductors, operations are the same as those in the aforementioned FIG. 9A.

Figure 9F:
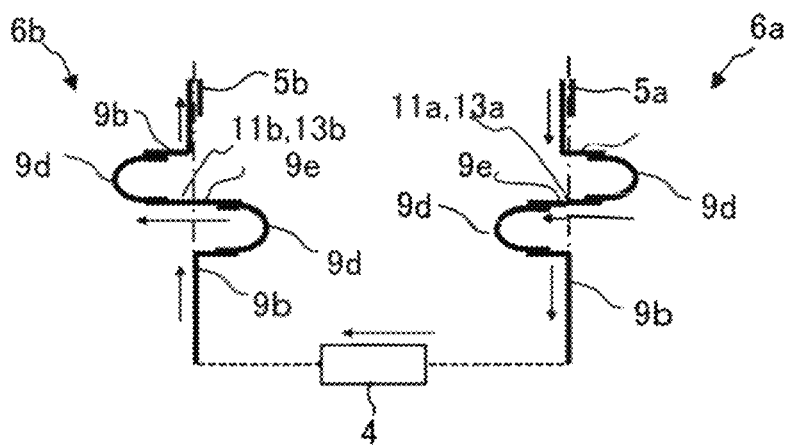
FIG. 9F shows other schematic shapes of the bypass connection conductors according to embodiment 2.

Although FIG. 9B shows the bypass connection conductors each formed in a bent shape by bowing a single plate-shaped conductor, in FIG. 9F, the first and second bypass connection conductors 6a and 6b are formed in the same bowed shapes as those of the bowed-shape conductors 8a and 8b in FIG. 9B by joining U-shaped conductors 9d, L-shaped conductors 9b, and linear conductors 9e. Although the bowed-shape conductors 8a and 8b in FIG. 9B are each formed of a single conductor and thus are difficult to be machined, the same shapes are obtained by combining a plurality of conductors that are easily machined. Apart from the shapes of the bypass connection conductors, operations are the same as those in the aforementioned FIG. 9A.

Figure 9G:
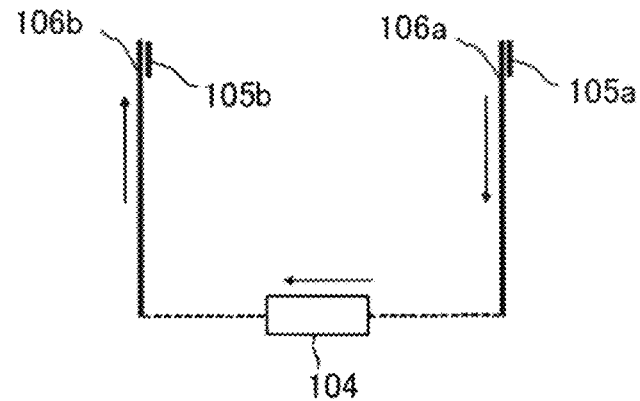
FIG. 9G shows an example of bypass connection conductors to be compared with the bypass connection conductors according to embodiment 2.

FIG. 9G shows linear bypass connection conductors. A first bypass connection conductor 106a and a second bypass connection conductor 106b are linear. The first bypass connection conductor 106a has one end connected to the first external output conductor 105a and has another end connected to the high-potential side of the bypass portion 104. The second bypass connection conductor 106b has one end connected to the second external output conductor 105b and has another end connected to the low-potential side of the bypass portion 104. Current in the first bypass connection conductor 106a and current in the second bypass connection conductor 106b flow in opposite directions as indicated by the arrows, and the first bypass connection conductor 106a and the second bypass connection conductor 106b are disposed so as to face each other.

Next, functions and effects of the shapes of the bypass connection conductors according to the present embodiment shown in FIG. 9A to FIG. 9F will be described through comparison with FIG. 9G.

First, in FIG. 9G, the first bypass connection conductor 106a and the second bypass connection conductor 106b are linear, and the connection between the bypass portion 104 and each of the first external output conductor 105a and the second external output conductor 105b is shortest. Therefore, the self-inductance (La0) of the first bypass connection conductor 106a and the self-inductance (Lb0) of the second bypass connection conductor 106b are low. In addition, the first bypass connection conductor 106a and the second bypass connection conductor 106b are disposed so as to face each other, and currents in the bypass connection conductors flow in different directions. Therefore, negative mutual inductances (−M) are generated. A combined inductance Lbp0 is expressed with the following expression (3).

$$Lbp0 = La0 + Lb0 - 2M \qquad (3)$$

Meanwhile, in FIG. 9A, the first bypass connection conductor 6a and the second bypass connection conductor 6b have bent shapes and thus have increased wiring lengths. Accordingly, the first bypass connection conductor 6a and the second bypass connection conductor 6b respectively have a higher self-inductance (La1: La1>La0) and a higher self-inductance (Lb1: Lb1>Lb0) than the bypass connection conductors having the shortest wiring lengths. In addition, current in the first portion 11a of the first bypass connection conductor 6a and current in the second portion 11b of the second bypass connection conductor 6b flow in spatially the same direction. Further, the first portion 11a and the second portion 11b are disposed so as to face each other along the current direction. Therefore, positive mutual inductances (+M) are generated. A combined inductance Lbp1 is expressed with the following expression (4).

$$Lbp1 = La1 + Lb1 + 2M \qquad (4)$$

It is found that Lbp1>Lbp0 is satisfied.

That is, the combined inductance becomes higher than that in the conventional configuration. Consequently, short-circuit current indicated by the thick line in FIG. 4 is suppressed before flowing to the bypass portion 4. Therefore, the bypass portion 4 can be inhibited from being damaged.

The shapes of the bypass connection conductors in FIG. 9B to FIG. 9F also allow the combined inductances to be higher than that in the conventional configuration in the same manner as in FIG. 9A, whereby the same advantageous effect can be exhibited. That is, since short-circuit current indicated by the thick line in FIG. 4 is suppressed before flowing to the bypass portion 4, the bypass portion 4 can be inhibited from being damaged.

In FIG. 9A to FIG. 9F, examples in which the second direction is perpendicular to the first direction have been shown. However, if the second direction intersects with the first direction, the second direction does not need to be perpendicular thereto. Current flowing in the second direction only has to have a component in a direction perpendicular to the first direction. Further, in the case where currents flowing in the second direction are opposite to each other at some locations depending on the arrangement of the bent shapes, if components in the same current direction are set to be higher than components in opposite current directions, the third term in the above-described expression (4) takes a positive value, whereby short-circuit current is suppressed before flowing to the bypass portion 4.

Figure 9H:
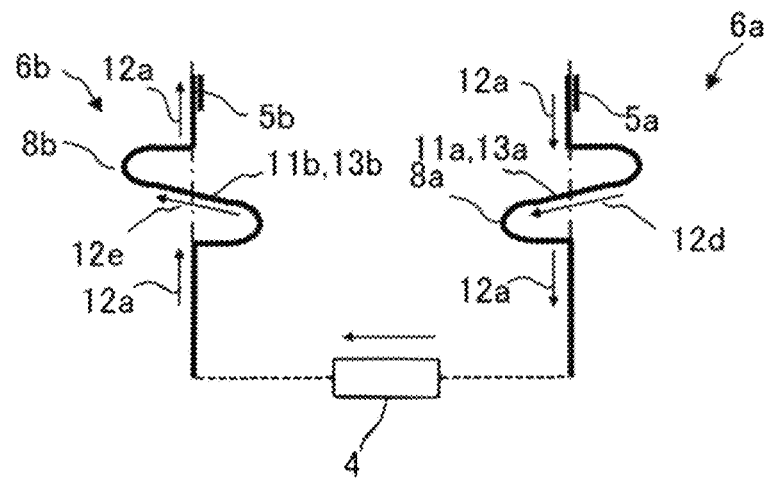
FIG. 9H shows other schematic shapes of the bypass connection conductors according to embodiment 2.

For example, FIG. 9H is a modification of FIG. 9B. While FIG. 9B shows the arrows 12b as the second direction, FIG. 9H is a diagram showing bent shapes formed such that the second direction is set to the direction of the arrow 12d in the first bypass connection conductor 6a and is set to the direction of the arrow 12e in the second bypass connection conductor 6b. Each of the arrows 12d and 12e is, for example, within an angle range not larger than 30 degrees relative to the arrow 12b. In addition, an angle between the arrow 12d and the arrow 12e is, for example, not larger than 60 degrees. In this case as well, the first portion 11a and the second portion 11b can exhibit the effect due to components in the same current direction 12b and can also exhibit the effect due to parallel components in the first surface 13a of the first portion 11a and the second surface 13b of the second portion 11b, i.e., the effect of alleviating influence of electromagnetic repulsive force when short-circuit current flows to the bypass portion 4.

Figure 9I:
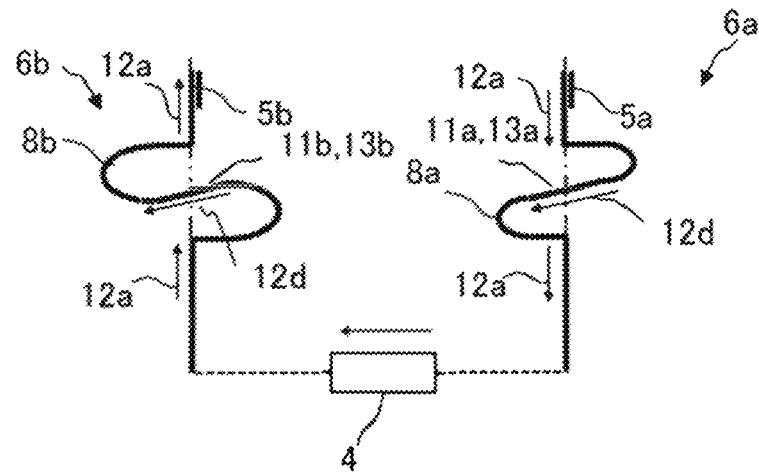
FIG. 9I shows other schematic shapes of the bypass connection conductors according to embodiment 2.

Furthermore, FIG. 9I is another modification of FIG. 9B. In FIG. 9I, bent shapes are formed such that the second direction is set to the direction of the arrow 12d in both the first bypass connection conductor 6a and the second bypass connection conductor 6b. The arrow 12d is, for example, within an angle range not larger than 45 degrees relative to the arrow 12b. In this case as well, the first portion 11a and the second portion 11b can exhibit the effect due to components in the same current direction 12b. Further, the first surface 13a of the first portion 11a and the second surface 13b of the second portion 11b are parallel to each other, whereby it is also possible to exhibit the effect of alleviating influence of electromagnetic repulsive force when short-circuit current flows to the bypass portion 4.

Although two exemplary modifications of FIG. 9B have been shown, the same applies also to FIG. 9A and FIG. 9C to FIG. 9F. Specifically, if the second direction intersects with the first direction, the second direction does not need to be perpendicular thereto, and current flowing in the second direction only has to have a component in a direction perpendicular to the first direction.

In this manner, embodiment 2 is also such that: the second direction does not have to be perpendicular to the first direction and only has to be a direction intersecting with the first direction at an angle that is within the predetermined range; there only have to be components that are perpendicular to the first direction and that are in the same current direction; and, out of current components generated by forming the bent shapes, components in the same current direction are set to be higher than components in opposite current directions.

In addition, although not shown, a board and a power supply for driving the switching elements 1a and 1b and the bypass portion 4 are present in a space from the location at which the bypass portion 4 is disposed to the housing 200 for the cell converter located outward. Thus, if a configuration is made in which positive mutual inductances (+M) are generated, there is no need for elongating, in order to increase the self-inductances, the lengths in the lateral direction of the bypass connection conductors from the location at which the bypass portion 4 is disposed to a space located outward. Therefore, the bypass connection conductors can be formed in reduced sizes.

As described above, embodiment 2 is such that: the shape of the first bypass connection conductor 6a and the shape of the second bypass connection conductor 6b are formed so as to include bent shapes; the first bypass connection conductor 6a and the second bypass connection conductor 6b have the first and second portions which extend in the direction perpendicular to the direction from the connections with the first and second external output conductors 5a and 5b to the connections with the bypass portion 4, i.e., the up-down direction of the housing, respectively; these first and second portions at least spatially overlap with each other; and the directions of currents in the first and second portions are spatially the same direction when double abnormalities occur in the cell converter. Consequently, the inductances are increased, and thus overcurrent flowing to the bypass portion 4 can be suppressed, whereby a highly reliable power conversion device can be realized. Further, the above-described bypass connection conductors 6a and 6b having the bent shapes can be disposed by making use of the space in the housing. Thus, it is possible to obtain, without increasing the sizes of the cell converters, a small-sized and inexpensive power conversion device that can be continuously operated also in the case where double abnormalities occur in any of the cell converters.

In addition, since currents flow in the external output conductors 5a and 5b of embodiment 1 also in mode 1 to mode 4 which are steady operations so that power loss increases in association with increases in the inductances of the external output conductors 5a and 5b, a more advantageous effect is exhibited in terms of power loss in embodiment 2 in which the inductances of the external output conductors 5a and 5b are not increased.

It is noted that although the external output conductors 5a and 5b are formed so as to have bent shapes in the above-described embodiment 1 and the bypass connection conductors 6a and 6b are formed so as to have bent shapes in the above-described embodiment 2, embodiments 1 and 2 may be combined with each other. In this case, care needs to be taken for arrangement so as not to increase the number of locations at which current directions are different between the adjacent conductors.

In addition, although examples in which plate-shaped conductors are used for the external output conductors 5a and 5b and the bypass connection conductors 6a and 6b have been described, the shapes of the conductors are not limited to plate shapes.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS 1a, 1b switching element
2 capacitor
3a, 3b main circuit conductor
4 bypass portion
5a first external output conductor
5b second external output conductor
6a first bypass connection conductor
6b second bypass connection conductor
7a, 7b angled-shape conductor
8a, 8b bowed-shape conductor
9a rectangular U-shaped conductor
9b L-shaped conductor
9c rectangular S-shaped conductor
9d U-shaped conductor
9e linear conductor
10a first conductor portion
10b second conductor portion
11a first portion
11b second portion 12a, 12b, 12c, 12d, 12e arrow
13a first surface
13b second surface
X1, X2 external terminal
100, 100a, 100b, 100c cell converter

The invention claimed is:

1. A power conversion device in which a plurality of cell converters that perform power conversion are connected in series, each cell converter comprising:
   a switching element;
   a capacitor;
   a main circuit conductor connecting the switching element and the capacitor to each other;
   two external terminals connected to other ones of the cell converters;
   a bypass portion disposed between the two external terminals and subjected to bypass connection;
   a first conductor portion connecting one of the two external terminals and each of the main circuit conductor and the bypass portion to each other; and
   a second conductor portion connecting another one of the two external terminals and each of the main circuit conductor and the bypass portion to each other, wherein
   the first and second conductor portions are each formed in a bent shape between the main circuit conductor and the bypass portion so as to, with respect to a first direction which is a direction of a path from the main circuit conductor to the bypass portion, have a portion that extends in a second direction intersecting with the first direction,
   a first portion, of the first conductor portion, that extends in the second direction and a second portion, of the second conductor portion, that extends in the second direction are disposed so as to at least partially overlap with each other in a third direction that intersects with the first and second directions, and
   when current flows from the capacitor to the bypass portion, currents in a same direction flow in the first portion and the second portion.

2. The power conversion device according to claim 1, wherein
   the first conductor portion includes
      a first external output conductor connecting the one of the two external terminals and the main circuit conductor to each other, and
      a first bypass connection conductor connecting the first external output conductor and one end of the bypass portion to each other,
   the second conductor portion includes
      a second external output conductor connecting the other one of the two external terminals and the main circuit conductor to each other, and
      a second bypass connection conductor connecting the second external output conductor and another end of the bypass portion to each other,
   the first portion is provided to the first bypass connection conductor, and
   the second portion is provided to the second bypass connection conductor.

3. The power conversion device according to claim 2, wherein
   the first portion is formed by angling a part of the first bypass connection conductor which is a single conductor member, and
   the second portion is formed by angling a part of the second bypass connection conductor which is a single conductor member.

4. The power conversion device according to claim 3, wherein
   the first portion has a first surface which is parallel to the third direction, and
   the second portion has a second surface which is parallel to the third direction.

5. The power conversion device according to claim 2, wherein
   the first portion is formed by bowing a part of the first bypass connection conductor which is a single conductor member, and
   the second portion is formed by bowing a part of the second bypass connection conductor which is a single conductor member.

6. The power conversion device according to claim 5, wherein
   the first portion has a first surface which is parallel to the third direction, and
   the second portion has a second surface which is parallel to the third direction.

7. The power conversion device according to claim 2, wherein each of the first and second bypass connection conductors is formed by combining conductors from among an L-shaped conductor, an S-shaped conductor, a U-shaped conductor, and a linear conductor.

8. The power conversion device according to claim 7, wherein
   the first portion has a first surface which is parallel to the third direction, and
   the second portion has a second surface which is parallel to the third direction.

9. The power conversion device according to claim 2, wherein
   the first portion has a first surface which is parallel to the third direction, and
   the second portion has a second surface which is parallel to the third direction.

10. The power conversion device according to claim 1, wherein
    the first conductor portion includes
       a first external output conductor connecting the one of the two external terminals and the main circuit conductor to each other, and
       a first bypass connection conductor connecting the first external output conductor and one end of the bypass portion to each other,
    the second conductor portion includes
       a second external output conductor connecting the other one of the two external terminals and the main circuit conductor to each other, and
       a second bypass connection conductor connecting the second external output conductor and another end of the bypass portion to each other,
    the first portion is provided to the first external output conductor, and
    the second portion is provided to the second external output conductor.

11. The power conversion device according to claim 10, wherein
    the first external output conductor is composed of a single conductor member between the main circuit conductor and a connection with the first bypass connection conductor,
    the first portion is formed by angling a part of the first external output conductor which is a single conductor member, the second external output conductor is composed of a single conductor member between the main circuit conductor and a connection with the second bypass connection conductor, and the second portion is formed by angling a part of the second external output conductor which is a single conductor member.

12. The power conversion device according to claim 11, wherein the first portion has a first surface which is parallel to the third direction, and the second portion has a second surface which is parallel to the third direction.

13. The power conversion device according to claim 10, wherein the first external output conductor is composed of a single conductor member between the main circuit conductor and a connection with the first bypass connection conductor, the first portion is formed by bowing a part of the first external output conductor which is a single conductor member, the second external output conductor is composed of a single conductor member between the main circuit conductor and a connection with the second bypass connection conductor, and the second portion is formed by bowing a part of the second external output conductor which is a single conductor member.

14. The power conversion device according to claim 13, wherein the first portion has a first surface which is parallel to the third direction, and the second portion has a second surface which is parallel to the third direction.

15. The power conversion device according to claim 10, wherein each of the first and second external output conductors is formed by combining conductors from among an L-shaped conductor, an S-shaped conductor, a U-shaped conductor, and a linear conductor.

16. The power conversion device according to claim 15, wherein the first portion has a first surface which is parallel to the third direction, and the second portion has a second surface which is parallel to the third direction.

17. The power conversion device according to claim 10, wherein the first portion has a first surface which is parallel to the third direction, and the second portion has a second surface which is parallel to the third direction.

18. The power conversion device according to claim 1, wherein the first portion has a first surface which is parallel to the third direction, and the second portion has a second surface which is parallel to the third direction.

* * * * *